(12) United States Patent
Droz et al.

(10) Patent No.: US 12,339,371 B2
(45) Date of Patent: Jun. 24, 2025

(54) MULTIMODE LIDAR RECEIVER FOR COHERENT DISTANCE AND VELOCITY MEASUREMENTS

(71) Applicant: Waymo LLC, Mountain View, CA (US)

(72) Inventors: Pierre-Yves Droz, Los Altos, CA (US); Pablo Hopman, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 1023 days.

(21) Appl. No.: 17/305,361

(22) Filed: Jul. 6, 2021

(65) Prior Publication Data

US 2023/0015218 A1     Jan. 19, 2023

(51) Int. Cl.

| G01C 3/08 | (2006.01) |
| G01S 7/48 | (2006.01) |
| G01S 7/484 | (2006.01) |
| G01S 7/486 | (2020.01) |
| G01S 17/931 | (2020.01) |
| G01S 17/933 | (2020.01) |

(52) U.S. Cl.
CPC .......... *G01S 17/931* (2020.01); *G01S 7/4808* (2013.01); *G01S 7/484* (2013.01); *G01S 7/486* (2013.01); *G01S 17/933* (2013.01)

(58) Field of Classification Search
CPC .... G01S 17/931; G01S 17/933; G01S 7/4808; G01S 7/484; G01S 7/486
See application file for complete search history.

(56) References Cited

U.S. PATENT DOCUMENTS

| 5,283,795 A | 2/1994 | Fink |
| 5,574,537 A | 11/1996 | Ozawa |
| 8,112,223 B2 | 2/2012 | Jordan et al. |
| 8,687,173 B2 | 4/2014 | Rezk et al. |
| 9,851,470 B2 | 12/2017 | Henderson et al. |
| 10,436,906 B2 | 10/2019 | Droz |

(Continued)

FOREIGN PATENT DOCUMENTS

| CN | 101236253 A | * | 8/2008 | ............. G01S 17/02 |
| CN | 111796297 A | * | 10/2020 | ........... G01S 7/4802 |
| CN | 111999739 A | | 11/2020 | |

OTHER PUBLICATIONS

AEYE iDAR "iDAR is Smarther than LiDAR", aeye.ai/idar/, retrieved Oct. 20, 2020, 11 pages.

(Continued)

*Primary Examiner* — Mark Hellner
(74) *Attorney, Agent, or Firm* — LOWENSTEIN SANDLER LLP

(57) ABSTRACT

The subject matter of this specification can be implemented in, among other things, systems and methods that enable lidar devices capable of detecting and processing multiple optical modes present in a beam reflected from a target object. Different received optical modes can be spatially separated and electronic signals can be generated that are representative of a coherence information contained in various optical modes. Multiple generated electronic signals can be amplified, phase-shifted, mixed, etc., to identify signals, individually or in a combination, that can be used for identification of a range and velocity of the target object with the highest accuracy.

20 Claims, 6 Drawing Sheets

(56) References Cited

U.S. PATENT DOCUMENTS

| | | |
|---|---|---|
| 11,592,560 B2 | 2/2023 | Schmalenberg et al. |
| 2002/0071109 A1 | 6/2002 | Allen et al. |
| 2005/0213075 A1 | 9/2005 | Cooke |
| 2010/0073222 A1 | 3/2010 | Mitomo et al. |
| 2010/0128744 A1 | 5/2010 | Deladurantaye et al. |
| 2013/0027240 A1 | 1/2013 | Chowdhury |
| 2013/0044309 A1 | 2/2013 | Dakin et al. |
| 2014/0063484 A1 | 3/2014 | Tauro et al. |
| 2014/0209798 A1* | 7/2014 | Woodward ............... G02B 6/04 250/227.28 |
| 2016/0299228 A1 | 10/2016 | Maleki et al. |
| 2018/0180739 A1 | 6/2018 | Droz |
| 2018/0217234 A1 | 8/2018 | Skowronek |
| 2018/0267151 A1 | 9/2018 | Hall et al. |
| 2019/0018140 A1 | 1/2019 | Sarkissian et al. |
| 2019/0086518 A1 | 3/2019 | Hallstig et al. |
| 2019/0195665 A1 | 6/2019 | Soga et al. |
| 2019/0257641 A1 | 8/2019 | Tsuchida |
| 2019/0265334 A1 | 8/2019 | Zhang et al. |
| 2019/0339389 A1 | 11/2019 | Russo et al. |
| 2020/0090355 A1 | 3/2020 | Hall |
| 2020/0217961 A1 | 7/2020 | Russo et al. |
| 2021/0149041 A1 | 5/2021 | Cho et al. |
| 2021/0318435 A1 | 10/2021 | Schmalenberg et al. |
| 2021/0382370 A1 | 12/2021 | Di Teodoro et al. |
| 2021/0396887 A1 | 12/2021 | Schmalenberg |
| 2021/0405203 A1* | 12/2021 | Barber ................. G01S 7/4912 |

OTHER PUBLICATIONS

Aurora "FMCW Lidar: The Self-Driving Game-Changer" medium.com/aurora-blog/fmcw-lidar-the-self-driving-game-changer-194fd311fd0e9, Apr. 9, 2020, retreived on Oct. 20, 2020, 6 pages.

GreenCarCongress.com "Aeva Announces Aeries 4D FMCW Lidar-on-chip for Autonomous Driving; Recent Porsche Investment", greecarcongress.com/2019/12/20191212.aeva.html, Dec. 12, 2019, 11 pages.

Lekavich, John, "Basics fo Acousto-Optic Devices", Lasers & Applications Apr. 1986, pp. 59-64.

Marino, A.M. et al., "Phase-Locked Laser System for Use in Atomic Coherence Experiments", Review of Scientific Instruments 79, 013104 (2008), published online Jan. 11, 2008, pp. 013104-1-013104-8.

International Search Report and Written Opinion dated Mar. 30, 2022, on application No. PCT/US2021/061481, 10 pages.

International Search Report and Written Opinion dated Feb. 7, 2022, on application No. PCT/US2021/055093, 14 pages.

\* cited by examiner

MULTIMODE LIDAR RECEIVER FOR COHERENT DISTANCE AND VELOCITY MEASUREMENTS

TECHNICAL FIELD

The instant specification generally relates to range and velocity sensing in applications that involve determining locations and velocities of moving objects using optical signals reflected from the objects. More specifically, the instant specification relates to improving efficiency and consistency of range and velocity sensing by collecting and processing multiple modes of the reflected signals.

BACKGROUND

Various automotive, aeronautical, marine, atmospheric, industrial, and other applications that involve tracking locations and motion of objects benefit from optical and radar detection technology. A rangefinder (radar or optical) device operates by emitting a series of signals that travel to an object and then detecting signals reflected back from the object. By determining a time delay between a signal emission and an arrival of the reflected signal, the rangefinder can determine a distance to the object. Additionally, the rangefinder can determine the velocity (the speed and the direction) of the object's motion by emitting two or more signals in a quick succession and detecting a changing position of the object with each additional signal. Coherent rangefinders, which utilize the Doppler effect, can determine a longitudinal (radial) component of the object's velocity by detecting a change in the frequency of the arrived wave from the frequency of the emitted signal. When the object is moving away from (towards) the rangefinder, the frequency of the arrived signal is lower (higher) than the frequency of the emitted signal, and the change in the frequency is proportional to the radial component of the object's velocity. Autonomous (self-driving) vehicles operate by sensing an outside environment with various electromagnetic (radio, optical, infrared) sensors and charting a driving path through the environment based on the sensed data. Additionally, the driving path can be determined based on positioning (e.g., Global Positioning System (GPS)) and road map data. While the positioning and the road map data can provide information about static aspects of the environment (buildings, street layouts, etc.), dynamic information (such as information about other vehicles, pedestrians, cyclists, etc.) is obtained from contemporaneous electromagnetic sensing data. Precision and safety of the driving path and of the speed regime selected by the autonomous vehicle depend on the quality of the sensing data and on the ability of autonomous driving computing systems to process the sensing data and to provide appropriate instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 5A illustrates a linear array of active regions; FIG. 5B illustrates a concentric array of active regions; and FIG. 5C illustrates a two-dimensional mixed array of active regions some of which can include concentric circles.

SUMMARY

Figure 1:
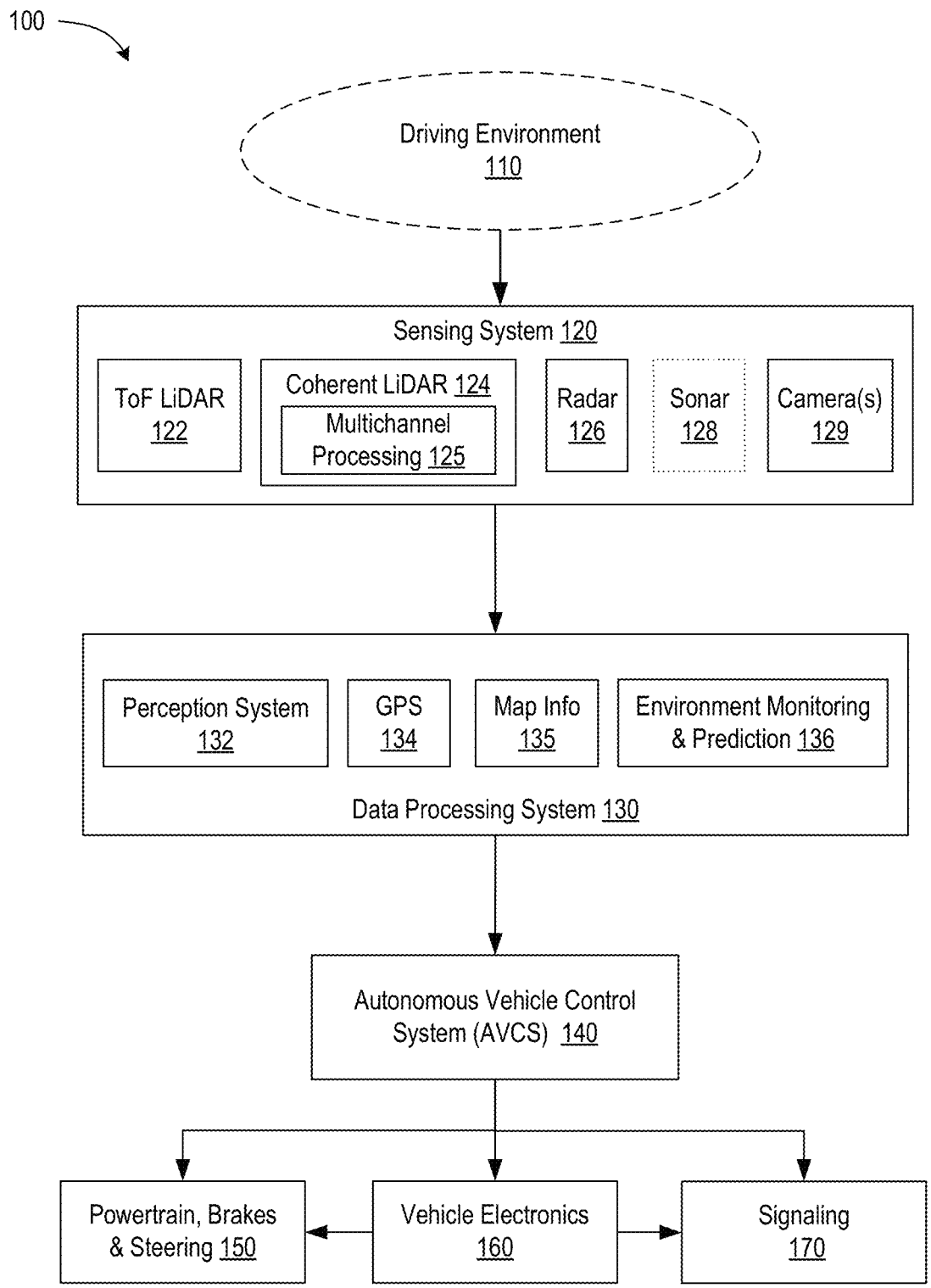
FIG. 1 is a diagram illustrating components of an example autonomous vehicle that can deploy coherent lidar(s) capable of detecting and processing multiple modes in the reflected beam, in accordance with some implementations of the present disclosure.

In one implementation, disclosed is a system that includes an optical subsystem configured to receive a beam reflected from an object, the beam having a plurality of modes. The system further includes a plurality of light detectors, each of the plurality of light detectors configured to receive, from the optical subsystem: a respective mode of the plurality of modes, and a local oscillator (LO) copy of a beam transmitted towards the object, and to output: one or more electronic signals representative of a difference between the respective mode of the plurality of modes and the LO copy. The system further includes a combiner, operatively coupled with the plurality of light detectors, to produce a combined electronic signal based on the one or more electronic signals output by each of the plurality of light detectors. The system further includes one or more circuits, operatively coupled with the combiner, to determine, based on the combined electronic signal, at least one of a velocity of the object or a distance to the object.

In another implementation, disclosed is a sensing system that includes an optical subsystem to transmit a first beam towards an object, wherein the first beam is a single-mode beam; and receive a second beam generated upon interaction of the first beam with the object, wherein the second beam comprises a plurality of optical modes. The system further includes a light detection subsystem, operatively coupled with the optical subsystem, to generate a plurality of electronic signals, wherein each of the plurality of electronic signals is obtained using a respective one of the plurality of optical modes. The system further includes one or more circuits, operatively coupled with the light detection subsystem, to: determine, based on at least some of the plurality of electronic signals, a characteristic of the object, wherein the characteristic of the object comprises at least one of a velocity of the object or a distance to the object.

In another implementation, disclosed is a method that includes: transmitting a first beam towards an object, wherein the first beam is a single-mode beam; receiving a second beam generated upon interaction of the first beam with the object, wherein the second beam comprises a plurality of optical modes; generating a plurality of electronic signals, wherein each of the plurality of electronic signals is obtained using a respective one of the plurality of optical modes; and determining, based on at least some of the plurality of electronic signals, a characteristic of the object, wherein the characteristic of the object comprises at least one of a velocity of the object or a distance to the object.

DETAILED DESCRIPTION

An autonomous vehicle can employ a light detection and ranging (lidar) technology to detect distances to various objects in the environment and, sometimes, the velocities of such objects. A lidar emits one or more laser signals (pulses) that travel to an object and then detects arrived signals reflected from the object. By determining a time delay between the signal emission and the arrival of the reflected waves, a time-of-flight (ToF) lidar can determine the distance to the object. A typical lidar emits signals in multiple directions to obtain a wide view of the outside environment. For example, a lidar device can cover (e.g., scan) an entire 360-degree view by collecting a series of consecutive frames identified with timestamps. As a result, each sector in space is sensed in time increments $\Delta\tau$, which are determined by the angular velocity of the lidar's scanning speed. "Frame" or "sensing frame," as used herein, can refer to an entire 360-degree view of the environment obtained over a scan of the lidar or, alternatively, to any smaller sector, e.g., a 1-degree, 5-degree, a 10-degree, or any other angle obtained over a fraction of the scan cycle (revolution), or over a scan designed to cover a limited angle.

ToF lidars can also be used to determine velocities of objects in the environment, e.g., by detecting two (or more) locations $\vec{r}(t_1)$, $\vec{r}(t_2)$ of some reference point of an object (e.g., the front end of a vehicle) and inferring the velocity as the ratio, $\vec{v}=[\vec{r}(t_2)-\vec{r}(t_1)]/[t_2-t_1]$. By design, the measured velocity r is not the instantaneous velocity of the object but rather the velocity averaged over the time interval $t_2-t_1$, as the ToF technology does not allow to ascertain whether the object maintained the same velocity $\vec{v}$ during this time or experienced an acceleration or deceleration (with detection of acceleration/deceleration requiring additional locations $\vec{r}(t_3)$, $(t_4)$ . . . of the object).

Coherent lidars operate by detecting, in addition to ToF, a change in the frequency of the reflected signal—the Doppler shift—indicative of the velocity of the reflecting surface. Measurements of the Doppler shift can be used to determine, based on a single sensing frame, radial components (along the line of beam propagation) of the velocities of various reflecting points belonging to one or more objects in the environment. A signal emitted by a coherent lidar can be modulated (in frequency and/or phase) with a radio frequency (RF) signal prior to being transmitted to a target. A local copy of the transmitted signal can be maintained on the lidar and mixed with a signal reflected from the target; a beating pattern between the two signals can be extracted and Fourier-analyzed to determine the Doppler shift and identify the radial velocity of the target.

For enhanced coherence, a lidar transmitter can be designed and configured to output a small number of modes. (In a free space, e.g., the space between the lidar and a target, a mode can refer to a particular value of the wave vector and polarization of the electromagnetic wave.) Even though a beam or wave packet generally includes a superposition of waves with somewhat different wave vectors, in a precise and controlled environment of the lidar transmitter it can be possible to produce a single mode with a specific wave vector $\vec{k}_0$ and polarization (linear, circular, etc.) with various other wave vectors and polarizations contributing to a much smaller degree (and in some instances, negligibly). A wave, reflected from the target and detected by the lidar receiver, however, is a product of many factors that cannot always be controlled, including a type and quality of the reflecting surface, temperature of the surface, atmospheric conditions (temperature, density, motion of air, presence of particulate matter in it), and so on. As a result, the reflected beam is often a mixture of a number of modes with slightly different wave vectors $\vec{k}_1$, $\vec{k}_2$, $\vec{k}_3$, . . . (and respective polarizations).

When several modes of varying amplitude and phase are received by coherent light detectors of the lidar, the total signal can have fluctuations that cause the total signal to have a decreased coherence and signal-to-noise ratio (SNR) detrimentally affecting the accuracy of velocity (and distance) detection. In conventional lidar devices, a single mode is typically collected while other reflected modes are eliminated. However, the uncertainty of the atmospheric environment (e.g., air velocity and temperature disturbances) can destroy or at least reduce coherence of the selected mode below a desired level. Additionally, coherence can also be affected by variations in the optics of the lidar transmitter and receiver, including non-uniformity, defocus, aberration, and the like. One disadvantage of a single-mode detection is that, depending on specific (and frequently changing) conditions of the environment, it is possible that one of the carefully eliminated modes could have allowed a better lidar performance.

Aspects and implementations of the present disclosure enable systems and methods that detect multiple modes of the reflected signal for improved consistency and sensitivity of lidar devices. In many practical lidar applications (e.g., automotive applications), the wave front of the reflected beam experiences relatively mild distortions and most of the beam energy is concentrated in a few (e.g., ten or fewer) modes. In some implementations, the optical system of a lidar receiver can spatially separate modes of the reflected beam, each mode incident on its own photodetector. A local oscillator copy of the transmitted beam can be provided as a second input into the photodetectors. The photodetectors can output electronic (e.g., radio frequency) signals representative of a difference between the phase of the respective received reflected mode and the transmitted beam. Subsequently, the electronic signals can be combined before undergoing analog and digital processing to determine a velocity of the target (and a distance to the target). When combined, individual electronic signals can be increased or decreased in amplitude and phase-shifted to enhance a particular signal or produce a combination of signals that is likely to have a good coherence and SNR. In some implementations, the amplitude and phase shifts can be previously determined (e.g., using empirical testing) to maximize lidar performance for the current atmospheric conditions. Depending on these conditions, one of the modes can be enhanced relative to other modes. In some instances, phase shifts can compensate for a partial decoherence between two or more reflected modes that travel over slightly different paths from (as well as to) the target. In some instances, where one or some of the modes carry a weak optical signal, other modes can have a stronger amplitude. Accordingly, disclosed implementations are capable of turning the limitations of the conventional technology into advantages, by harvesting information provided by multiple modes of the reflected signal. This can improve accuracy, range, and reliability of lidar devices. In particular, changing conditions of the environment and targets can lead to some modes having a better coherence and a signal-to-noise ratio than other modes. Because a mode that provides a superior lidar performance may be different under different conditions, a multi-mode lidar sensor that is capable of detecting and selecting a mode with a stronger signal (or a combination of such modes) can successfully operate in situations where use of a single-mode sensor would have resulted in suboptimal performance.

FIG. 1 is a diagram illustrating components of an example autonomous vehicle (AV) 100 that can deploy coherent lidar(s) capable of detecting and processing multiple modes in the reflected beam, in accordance with some implementations of the present disclosure. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit 126 can be configured to sense both the spatial locations of the objects (including their spatial dimensions) and their velocities (e.g., using the radar Doppler shift technology). The sensing system 120 can include a ToF lidar sensor 122 (e.g., a lidar rangefinder), which can be a laser-based unit capable of determining distances to the objects in the driving environment 110. The ToF lidar sensor 122 can utilize wavelengths of electromagnetic waves that are shorter than the wavelength of the radio waves and can, therefore, provide a higher spatial resolution and sensitivity compared with the radar unit 126. The sensing system 120 can include a coherent lidar sensor 124, such as a frequency-modulated continuous-wave (FMCW) sensor, phase-modulated lidar sensor, amplitude-modulated lidar sensor, and the like. Coherent lidar sensor 124 can use optical heterodyne detection for velocity determination. In some implementations, the functionality of the ToF lidar sensor 122 and coherent lidar sensor 124 can be combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple coherent lidar sensor 124 units can be mounted on AV, e.g., at different locations separated in space, to provide additional information about a transverse component of the velocity of the reflecting object.

ToF lidar sensor 122 and/or coherent lidar sensor 124 can include one or more laser sources producing and emitting signals and one or more detectors of the signals reflected back from the objects. ToF lidar sensor 122 and/or coherent lidar sensor 124 can include spectral filters to filter out spurious electromagnetic waves having wavelengths (frequencies) that are different from the wavelengths (frequencies) of the emitted signals. In some implementations, ToF lidar sensor 122 and/or coherent lidar sensor 124 can include directional filters (e.g., apertures, diffraction gratings, and so on) to filter out electromagnetic waves that can arrive at the detectors along directions different from the reflection directions for the emitted signals. ToF lidar sensor 122 and/or coherent lidar sensor 124 can use various other optical components (lenses, mirrors, gratings, optical films, interferometers, spectrometers, local oscillators, and the like) to enhance sensing capabilities of the sensors.

In some implementations, ToF lidar sensor 122 and/or coherent lidar sensor 124 can be 360-degree scanning units (e.g., in a horizontal direction). In some implementations, ToF lidar sensor 122 and/or coherent lidar sensor 124 can be capable of spatial scanning along both the horizontal and vertical directions. In some implementations, the field of view can be up to 90 degrees in the vertical direction (e.g., with that at least a part of the region above the horizon can be scanned by the lidar signals or with at least part of the region below the horizon scanned by the lidar signals). In some implementations (e.g., in aeronautical environments), the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate at generally in the nearinfrared wavelength, but can include sensing technology that operate at other wavelengths as well as.

Coherent lidar sensor 124 can include multimode processing (MP) system 125 capable of detecting and processing multiple modes of the reflected signal for improved consistency and sensitivity of coherent lidar sensor 124. MP system 125 can include a receiving (RX) optical system (which can be a dedicated RX system or a combined TX/RX optical system) that can deploy front-end optics (apertures, lenses, mirrors, diffraction gratings, etc.), focusing optics (lenses, holographic plates, concave mirrors, diffraction optical elements, etc.) to separate and focus received modes, and one or more photodetectors to convert optical signals to electronic signals. The optical signals can include the received modes as well as local oscillator copies of the transmitted beam. The electronic signals can be representative of the coherence (phase and amplitude) information contained in the received optical modes. MP system 125 can further include electronics subsystem configured to extract such coherence information in an efficient way, e.g., by shifting a phase and changing an amplitude of some of the electronic signals prior to adding the signals to obtain a combined electronic signal. The phase shifting and amplitude modification can be performed to maximize the SNR of the combined electronic signal, which can then be mixed with a local copy of an RF signal that was used to impart phase or frequency modulation to the transmitted beam. The combined electronic signal can be used to determine a radial velocity of the target and/or a distance to the target.

The sensing system 120 can further include one or more cameras 129 to capture images of the driving environment 110. The images can be two-dimensional projections of the driving environment 110 (or parts of the driving environment 110) onto a projecting plane of the cameras (flat or non-flat, e.g. fisheye cameras). Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. In some implementations, the data processing system 130 can include a perception system 132. Perception system 132 can be configured to detect and track objects in the driving environment 110 and to recognize/identify the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (Doppler data and/or ToF data) to determine distances to various objects in the environment 110 and velocities (radial and transverse) of such objects. In some implementations, perception system 132 can use the lidar data in combination with the data captured by the camera(s) 129. In one example, the camera (s) 129 can detect an image of road debris partially obstructing a traffic lane. Using the data from the camera(s) 129, perception system 132 can be capable of determining the angular extent of the debris. Using the lidar data, the perception system 132 can determine the distance from the debris to the AV and, therefore, by combining the distance information with the angular size of the debris, the perception system 132 can determine the linear dimensions of the debris as well.

In another implementation, using the lidar data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the lidar data alone, for example, by recognizing an edge of the object (using horizontal scanning) and further determining how quickly the edge of the object is moving in the lateral direction. The perception system 132 can receive one or more sensor data frames from the sensing system 120. Each of the sensor frames can include multiple points. Each point can correspond to a reflecting surface from which a signal emitted by the sensing system 120 (e.g., by ToF lidar sensor 122, coherent lidar sensor 124, etc.) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on.

The perception system 132 can further receive information from a positioning subsystem, which can include a GPS transceiver (not shown), configured to obtain information about the position of the AV relative to Earth and its surroundings. The positioning data processing module 134 can use the positioning data, e.g., GPS and IMU data) in conjunction with the sensing data to help accurately determine the location of the AV with respect to fixed objects of the driving environment 110 (e.g. roadways, lane boundaries, intersections, sidewalks, crosswalks, road signs, curbs, surrounding buildings, etc.) whose locations can be provided by map information 135. In some implementations, the data processing system 130 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

Data processing system 130 can further include an environment monitoring and prediction component 136, which can monitor how the driving environment 110 evolves with time, e.g., by keeping track of the locations and velocities of the animated objects (relative to Earth). In some implementations, environment monitoring and prediction component 136 can keep track of the changing appearance of the environment due to motion of the AV relative to the environment. In some implementations, environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object A indicating accelerated motion of object A during the previous 3-second period of time, environment monitoring and prediction component 136 can conclude that object A is resuming its motion from a stop sign or a red traffic light signal. Accordingly, environment monitoring and prediction component 136 can predict, given the layout of the roadway and presence of other vehicles, where object A is likely to be within the next 3 or 5 seconds of motion. As another example, based on stored data for object B indicating decelerated motion of object B during the previous 2-second period of time, environment monitoring and prediction component 136 can conclude that object B is stopping at a stop sign or at a red traffic light signal. Accordingly, environment monitoring and prediction component 136 can predict where object B is likely to be within the next 1 or 3 seconds. Environment monitoring and prediction component 136 can perform periodic checks of the accuracy of its predictions and modify the predictions based on new data obtained from the sensing system 120.

The data generated by the perception system 132, the GPS data processing module 134, and environment monitoring and prediction component 136 can be used by an autonomous driving system, such as AV control system (AVCS) 140. The AVCS 140 can include one or more algorithms that control how the AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; (3) engage a brake unit to reduce (while acting in concert with the engine and the transmission) the vehicle's speed until a safe speed is reached; and (4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

The "autonomous vehicle" can include motor vehicles (cars, trucks, buses, motorcycles, all-terrain vehicles, recreational vehicle, any specialized farming or construction vehicles, and the like), aircrafts (planes, helicopters, drones, and the like), naval vehicles (ships, boats, yachts, submarines, and the like), robotic vehicles (e.g., factory, warehouse, sidewalk delivery robots, etc.) or any other self-propelled vehicles capable of being operated in a self-driving mode (without a human input or with a reduced human input). "Objects" can include any entity, item, device, body, or article (animate or inanimate) located outside the autonomous vehicle, such as roadways, buildings, trees, bushes, sidewalks, bridges, mountains, other vehicles, piers, banks, landing strips, animals, birds, or other things.

Figure 2:
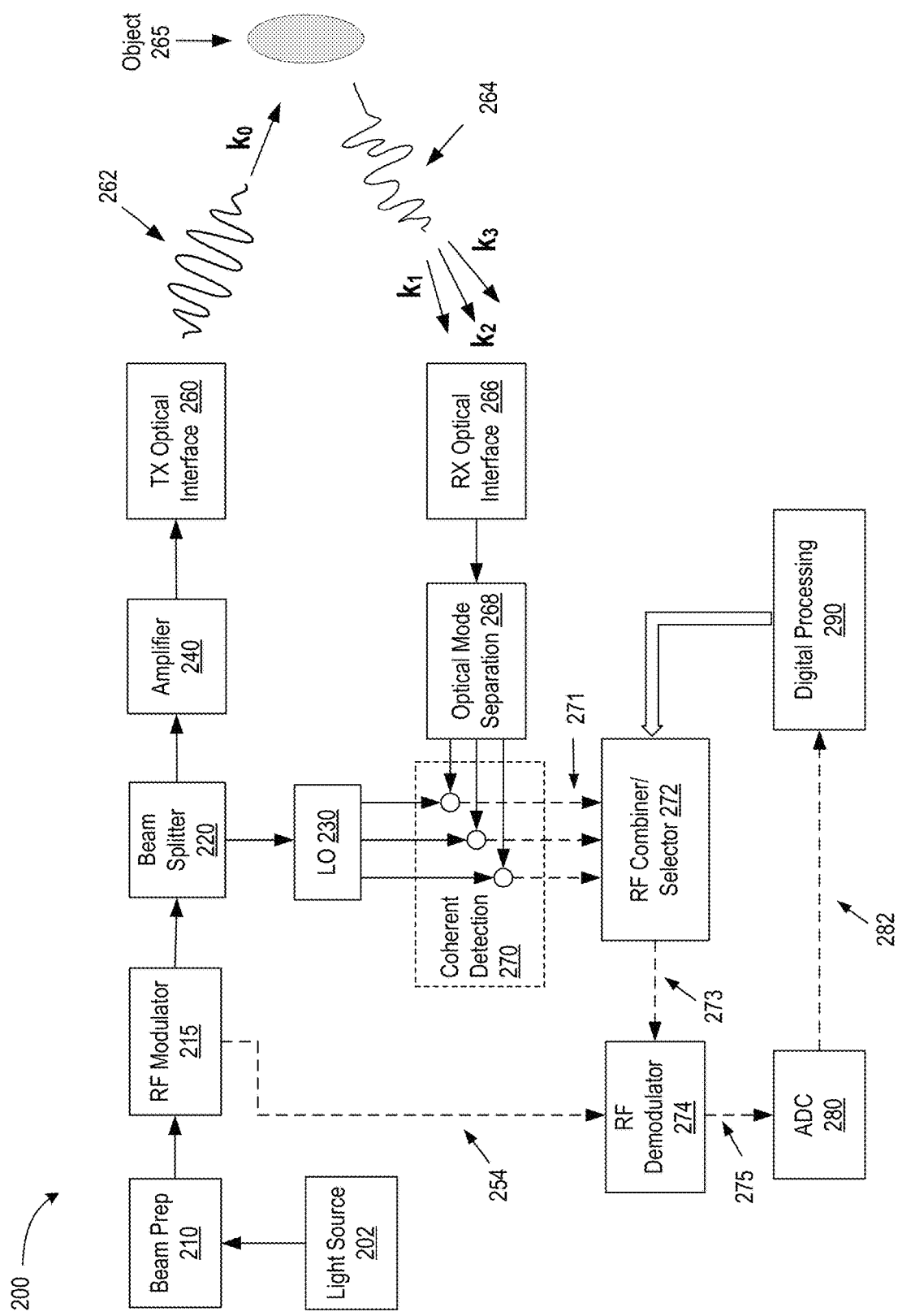
FIG. 2 is a block diagram illustrating an example implementation of an optical sensing system that detects multiple modes of a reflected beam for efficient and reliable range and velocity detection, in accordance with some aspects of the present disclosure.

FIG. 2 is a block diagram illustrating an example implementation of an optical sensing system 200 (e.g., a part of sensing system 120) that detects multiple modes of a reflected beam for efficient and reliable range and velocity detection, in accordance with some aspects of the present disclosure. Sensing system 200 can be a part of coherent lidar sensor 124 and can implement multimode processing 125. Depicted in FIG. 2 is a light source 202 configured to produce one or more beams of light. "Beams" should be understood herein as referring to any signals of electromagnetic radiation, such as beams, wave packets, pulses, sequences of pulses, or other types of signals. Solid arrows in FIG. 2 (and other figures) indicate optical signal propagation and dashed arrows in FIG. 2 (and other figures) depict propagation of electronic (e.g., RF or other analog or digital) signals. Light source 202 can be a broadband laser, a narrow-band laser, a light-emitting diode, a Gunn diode, and the like. Light source 202 can be a semiconductor laser, a gas laser, an ND:YAG laser, or any other type of a laser. Light source 202 can be a continuous wave laser, a single-pulse laser, a repetitively pulsed laser, a mode locked laser, and the like.

In some implementations, light output by the light source 202 can be conditioned (pre-processed) by one or more components or elements of a beam preparation stage 210 of the optical sensing system 200 to ensure narrow-band spectrum, target linewidth, coherence, polarization (e.g., circular or linear), and other optical properties that enable coherent (e.g., Doppler) measurements described below. Beam preparation can be performed using filters (e.g., narrow-band filters), resonators (e.g., resonator cavities, crystal resonators, etc.), polarizers, feedback loops, lenses, mirrors, diffraction optical elements, and other optical devices. For example, if light source 202 is a broadband light source, the output light can be filtered to produce a narrowband beam. In some implementations, where light source 202 produces light that has a desired linewidth and coherence, the light can still be additionally filtered, focused, collimated, diffracted, amplified, polarized, etc., to produce one or more beams of a desired spatial profile, spectrum, duration, frequency, polarization, repetition rate, and so on. In some implementations, light source 202 can produce a narrow-linewidth light with linewidth below 100 KHz.

Beam preparation stage 210 can include angle modulation of the beam using an RF modulator 215, which can include one or more RF circuits, such as an RF local oscillator (LO), one or more amplifiers, filters, and the like. Although modulation is referred herein as being performed with RF signals, other frequencies can also be used for angle modulation, including but not limited to Terahertz signals, microwave signals, and so on. RF modulator 215 can generate an RF signal that is imparted to the beam at the beam preparation stage 210. The RF signal can be input into an optical modulator of the beam preparation stage 210 to modulate the light beam. "Optical modulation" is to be understood herein as referring to any form of angle modulation, such as phase modulation (e.g., any time sequence of phase changes $\Delta\varnothing(t)$ added to the phase of the beam), frequency modulation (e.g., any sequence $\Delta f(t)$ of frequency changes), or any other type of modulation (including a combination of phase and frequency modulation) that affects the phase of the wave. Optical modulation is also to be understood herein as to include, where applicable, amplitude modulation. Amplitude modulation can be applied to the beam in combination with angle modulation or separately, without angle modulation. In some implementations, the optical modulator can include an acousto-optic modulator, an electro-optic modulator, a Lithium Niobate modulator, a heat-driven modulator, a Mach-Zender modulator, and the like, or any combination thereof. In some implementations, angle modulation can add phase/frequency shifts that are continuous functions of time. In some implementations, added phase/frequency shifts can be discrete and can take on a number of values, e.g., N discrete values across the phase interval $2\pi$. A time sequence of phase/frequency shifts can be added by an RF modulator 215 via an RF signal provided to the optical modulator of beam preparation stage 210, as depicted schematically by a corresponding dashed arrow in FIG. 2. The RF signal can cause the optical modulator to impart consecutive phase/frequency changes to the light beam. In some implementations, the RF signal can cause the optical modulator to impart to the light beam a sequence of frequency up-chirps interspersed with down-chirps. In some implementations, phase/frequency modulation can have a duration between a microsecond and tens of microseconds and can be repeated with a repetition rate ranging from a kilohertz to hundreds of kilohertz.

After optical modulation is performed, the light beam can undergo spatial separation at a beam splitter 220 to produce a local oscillator (LO) 230 copy of the modulated beam. The local oscillator 230 can be used as a reference signal to which a signal reflected from a target can be compared. The beam splitter 220 can be a prism-based beam splitter, a partially-reflecting mirror, a polarizing beam splitter, a beam sampler, a fiber optical coupler (optical fiber adaptor), or any similar beam splitting element (or a combination of two or more beam-splitting elements). The light beam can be delivered to the beam splitter 220 (as well as between any other components depicted in FIG. 2) over air or over light carriers such as optical fibers or other types of waveguide devices.

The light beam can be amplified by amplifier 240 before being transmitted through a transmission (TX) optical interface 260 towards one or more objects 265, which can be objects in the driving environment 110. Optical interface 260 can include one or more optical elements, apertures, lenses, mirrors, collimators, polarizers, waveguides, and the like, or any such combination of optical elements. The optical elements of the TX optical interface 260 can direct an output beam 262 to a target region in the outside environment. Although the output beam 262 is depicted (for conciseness) as a wave packet, any other electromagnetic signal or a combination of signals can be output by the TX optical interface 260, including a sequence of wave packets, one or more Gaussian beams, Hermite-Gaussian beams, Laguerre-Gaussian beams, Bessel beams, and the like. In some implementations, output beam 262 can be a single-mode beam characterized by a particular value of the wave vector $\vec{K}_0$ and polarization. To ensure that output beam 262 is a single-mode beam with a well-defined wave vector, a longitudinal $\Delta L_\parallel$ and lateral $\Delta\perp$ extent of the beam can be greater than the beam's wavelength $\lambda$, e.g., $\Delta L_\parallel$, $\Delta L\perp \gg \lambda = 2\pi/|\vec{K}_0|$.

Output beams 262 can travel to one or more objects 265 and, upon interaction with the respective objects, generate a reflected beam 264. The reflected beam 264 can enter the optical sensing system 200 via a receiving (RX) optical interface 266. In some implementations, RX optical interface 266 can share at least some optical elements with the TX optical interface 260, e.g., some of apertures, lenses, mirrors, collimators, polarizers, waveguides, and so on.

As a result of propagation of the transmitted beam 262 and the reflected beam 264 through the environment, as well as the interaction of the beams with the object 265, the reflected beam 264 can be a combination of multiple modes that can be characterized by different values of the wave vector, $\vec{K}_1, \vec{K}_2, \vec{K}_3, \ldots$ and, possibly, different polarizations. It should be understood that the depiction in FIG. 2 exaggerates, for the sake of illustration, a spatial non-uniformity of the reflected beam 264. Various modes received by the RX optical interface 266 can be separated (e.g., spatially) by an optical mode separation stage 268 that has one or more optical elements, such as one or more lenses, waveguide/optical fiber interfaces, diffraction optical elements, holographic plates, and the like. The separated modes can be processed by a coherent detection stage 270 that has one or more coherent light analyzers, such as balanced photodetectors (depicted with circles).

Each of the photodetectors can also receive a LO copy 230 of the transmitted beam. In some implementations, additional beam splitters can be used to generate multiple LO copies for multiple photodetectors. Each balanced photodetector can detect a phase difference between two input beams, e.g., a difference between the phase of the local oscillator 230 and a respective optical mode of the received beam. Balanced photodetectors can output electronic (e.g., RF) signals 271 representative of the information about the corresponding phase differences and provide the output RF signals 271 to an RF combiner/selector 272. The RF combiner/selector 272 can modify an amplitude and/or a phase of one or more of the output RF signals prior to adding the RF signals 271 to obtain a combined signal 273. Phase/amplitude tuning can select one or several RF signals 271 that have a high coherence and, therefore, a high signal-to-noise ratio, e.g., above an empirically established threshold SNR. In some implementations, amplitude modifications and phase shifts imparted by RF combiner/selector 272 to the RF signals 271 can depend on the existing environmental conditions. Amplitude modifications and phase shifts can be previously identified, e.g., during testing under similar conditions, and stored in a memory of a digital processing device 290. Amplitude modifications can enhance those RF signals 271 that maintain a high coherence/SNR (e.g., SNR above the threshold SNR) while reducing other RF signals 271 that suffer from a partial or complete decoherence of the respective optical modes (whose coherence information is represented by the RF signals 271). Phase shifts can compensate for a partial decoherence of some of the reflected modes. The term "combined signal" should be understood throughout this disclosure as any signal that is prepared in view of several RF signals 271 even where only one signal can eventually be selected (e.g., the highest SNR signal) for further processing while other signals are being filtered out.

The combined signal 273 can undergo demodulation by RF demodulator 274 using RF signal 254 which can be a copy of the RF signal used to impart phase or frequency modulation to the transmitted beam 262. The difference between the phase of the RF signal 254 and the combined signal 273 can be representative of the velocity of object 265 and the distance to object 265. For example, the relative phase of the two signals can be indicative of the Doppler frequency shift $\Delta f=2v/\lambda$, which in turn depends on the velocity v of the object (with the positive frequency shift $\Delta f>0$ corresponding to object 265 moving towards the system 200 and the negative frequency shift $\Delta f<0$ corresponding to the object 265 moving away from the system 200). Furthermore, the relative phase of the two signals can be representative of the distance to object 265. More specifically, RF signal 254 can include a sequence of features (e.g., chirp-up/chirp-down features) that can be used as timestamps to be compared with similar features of the combined signal 273. The distance to object 265 can be determined from a time delay in the temporal positions of the corresponding features in the two signals associated with propagation of the transmitted and reflected beams to and from the object. Accordingly, RF demodulator 274 can extract a beating pattern between the RF signal 254 and the combined signal 273, filtering out (e.g., using a low-pass filter) main RF carriers, amplifying the obtained signal, and so forth. The obtained low-frequency signal 275 can then be digitized using an analog-to-digital converter (ADC) 180.

A digital signal 282 output by ADC 280 can undergo digital processing 290 to determine the Doppler shift and the velocity of object 265. Additionally, a distance to object 265 can be extracted from a temporal shift (delay time) between frequency/phase modulation patterns of the RF signal 254 and the combined signal 273. Digital processing 290 can include spectral analyzers, such as Fast Fourier Transform (FTT) analyzers and other circuits to process digital signal 282.

In some implementations, RF combiner/selector 272, RF demodulator 274, ADC 280, and digital processing 290 can form a feedback loop for processing RF signals 271. For example, the phase and amplitude boosts imparted by RF combiner/selector 272 can be determined iteratively until the maximum (or acceptable) coherence and SNR of the combined signal 273 is achieved.

Figure 3:
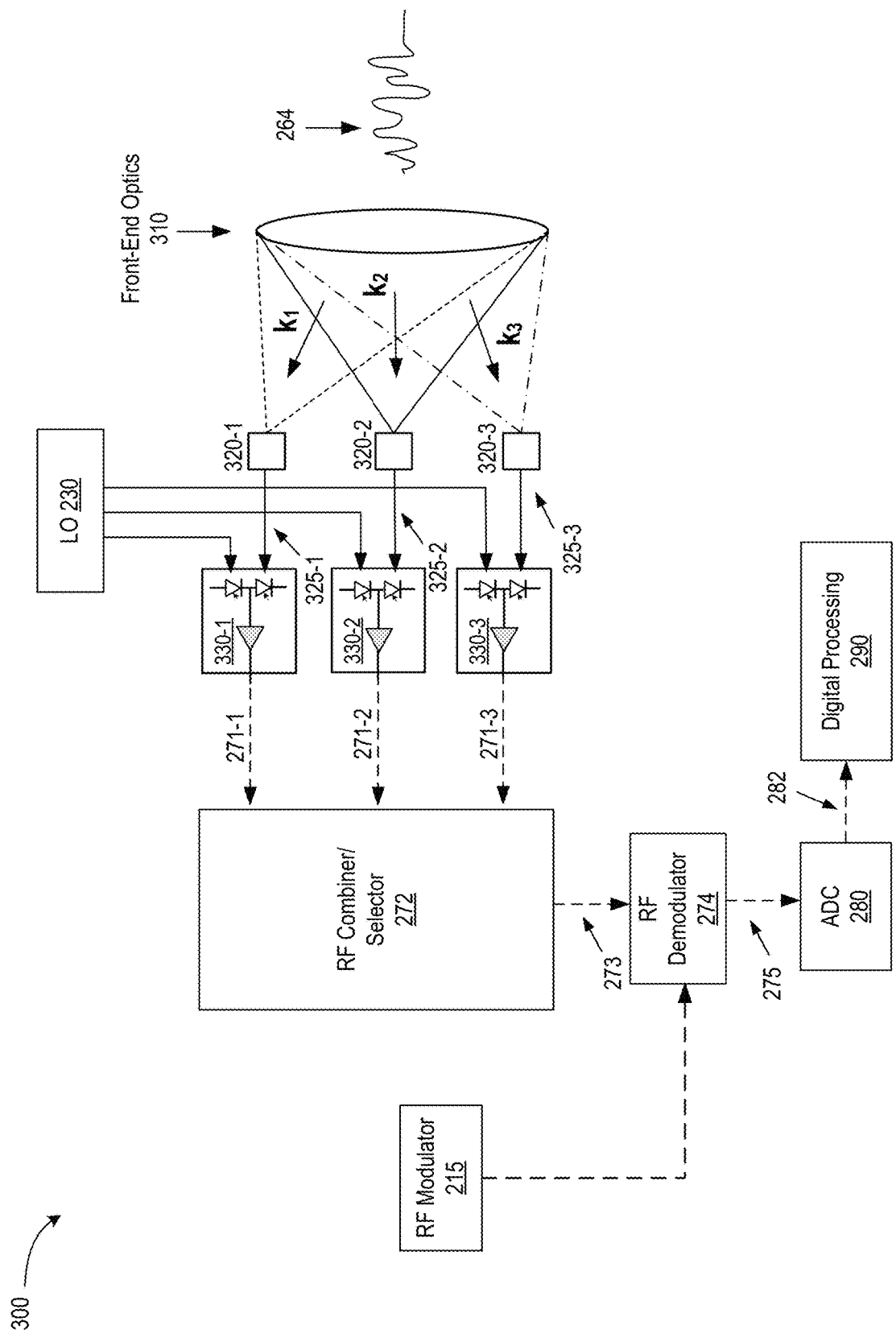
FIG. 3 is a block diagram illustrating an example implementation of a receiver of a lidar device for detection and processing of multiple modes of a reflected beam, in accordance with some aspects of the present disclosure.

FIG. 3 is a block diagram illustrating an example implementation of a receiver 300 of a lidar device for detection and processing of multiple modes of a reflected beam, in accordance with some aspects of the present disclosure. The receiver 300 can be a part of the optical sensing system 200 of FIG. 2, with various objects and components shown in both FIG. 2 and FIG. 3 sharing the same numbers. Incident beam 264, which can have multiple modes, can be incident on front-end optics 310. The front-end optics 310 can be a lens, a diffractive optical element (a grating, holographic plate, etc.), a combination of lenses, apertures, diffractive elements, mirrors, prisms, polarizers, and the like. In some implementations, front-end optics 310 can include focusing optics. As a result, different modes $\vec{k}_1, \vec{k}_2, \vec{k}_3, \ldots$, having slightly different wave fronts (directions of propagation), can be focused to different locations (as depicted schematically with dashed, solid, and dot-dashed lines) where respective optical interfaces 320-1, 320-2, 320-3, . . . are positioned. The optical interfaces can include ends of optical fibers, openings of waveguides, micromirrors, microlenses, and the like.

The received modes focused on optical interfaces 320 can be delivered over delivery channels 325-1, 325-2, 325-3 (e.g., over fibers, waveguides, or over air) to coherent light detectors 330-1, 330-2, 330-3. In some implementations, all or at least some of the optical interfaces 320 and delivery channels 325 can be implemented on a photonic integrated circuit (PIC). The PIC can further include various delivery channels of the TX optical interface 260 (not shown explicitly in FIG. 3). In some implementations, the RX delivery channels 325 and TX delivery channels can be the same channels (a monostatic configuration) with the RX modes separated from the transmitted mode using one or more optical circulators (which can be integrated into PICs or implemented as separate devices). In some implementations, no delivery channels are used and the received modes are focused directly on coherent light detectors 330.

As shown schematically, coherent light detectors 330 can include multiple photodiodes arranged in a balanced photodetection circuit, which can further include one or more operational amplifiers, e.g., transimpedance amplifiers (depicted with a shaded triangle), power sources, and the like. One or more copies of LO 230 can be input into each coherent light detector. In some implementations, each coherent light detecto 330 can include a beam splitter to separate an incoming mode into components $E_x$, $E_y$, corresponding to perpendicular linear polarizations (or to opposite circular polarizations $E_+$, $E_-$,) and another beam splitter to create multiple copies of LO 230. The different polarization components and LO copes (e.g., $E_x$, $E_{LO}$ and $E_y$, $E_{LO}$) can then be inputted into optical mixers (e.g., 90° hybrid mixers) to produce in-phase symmetric and anti-symmetric combinations $(E_x+E_{LO})/2$ and $(E_x+E_{LO})/2$ of the two beams, and quadrature 90-degree-shifted combinations $(E_x+iE_{LO})/2$ and $(E_x-iE_{LO})/2$ (and, similarly, for the second, e.g., $E_y$ polarization). A pair of photodiodes in a balanced configuration can receive a respective pair of the in-phase or quadrature signal and generate a respective electric (e.g., RF) signal representative of an in-phase electric current I or a quadrature current Q. In some implementations, each coherent light detector 330 can include four pairs of balanced photodiodes to produce the four signals $I_x$, $Q_x$, $I_y$, $Q_y$ containing information about a difference between the corresponding received optical mode and the LO copy 230. In some implementations, each coherent light detector 330 can include only two pairs of balanced photodiodes to produce two signals $I_x$, $Q_x$ containing information related to a single polarization (e.g., x or y). The generated (and, in some implementations, amplified) in-phase and quadrature currents can be formed into a complex photocurrent $J_x$ associated with polarization along x direction (e.g., $J_y=I_y+iQ_y$) and a complex photocurrent $J_y$ associated with polarization along y direction (e.g., $j_y=+iQ_y$) schematically depicted with dashed lines (RF signals) 271-1, 271-2, and 271-3 and representative of the coherence of the respective received optical mode (relative to the LO copy 230).

The complex photocurrents $J_k$ (index k enumerating optical modes including, if pertinent, polarizations), can be processed by RF combiner/selector 272, which can deploy various electronic circuits (e.g., amplifiers, local oscillators, low-pass filters, high-pass filters, band-pass filters, etc.) to form a combined signal 273

$$J_{comb} = \sum_k A_k \cdot e^{i\phi_k} \cdot J_k,$$

in which each signal $J_k$ can be adjusted in amplitude (factor $A_k$) and phase (phase boost $\phi_k$). Some of the signals can be unmodified ($A_k=1$, $\phi_k=0$), some of the signals can be filtered out ($A_k=0$). The parameters of amplitude and phase tuning, $A_k$, $\phi_k$ can be determined based on empirical testing, e.g., performed under conditions that are similar to the current conditions of the environment. The combined signal 273 ($J_{comb}$) can then be processed by RF demodulator 274, ADC 280, and digital processing stage 290 as described in conjunction with FIG. 2.

In some implementations, the mode composition of the combined signal 273 may be controlled by digital processing stage 290. For example, RF Combiner/Selector 272 may include one or more multiplexers that provide copies of the RF signals 271 directly to ADC 280. ADC 280 can convert the provided signals from an analog to a digital form and communicate the converted signals to digital processing stage 290 for coherence/SNR analysis. Digital processing stage 290 can perform a Fast Fourier Transformation and identify signals that correspond to separate modes. Digital processing stage 290 can further evaluate SNR for different modes and select those modes that have SNR above a predetermined threshold SNR. In some implementations, a fixed number (e.g., N) modes with the highest SNRs may be selected. In some implementations, up to N highest-SNR modes may be selected from those modes whose SNR is above the threshold. Having selected a set of modes, e.g., modes 1, 4, and 7, digital processing stage 290 can tune parameters of RF combiner/selector 272 (e.g., depths and widths of filters, settings of amplifiers, and the like) to amplify the selected modes and/or suppress other modes, adjust phases of some modes and so on.

In some implementations, digital processing stage 290 can dynamically track SNR (or other suitable characteristics of coherence) of various optical modes. As environmental conditions change, some of the high-SNR modes can lose coherence whereas some of the low-SNR modes may improve with time. Digital processing stage 290 can maintain a running average of the SNR of different modes over a predetermined time interval and base the determination of mode selection on the running average.

In some implementations, digital processing stage 290 can maintain predetermined settings for the mode selection. For example, based on previously performed empirical testing, and using the detected ambient temperature, the known distance from the lidar beam to the road, the temperature gradient above the roadway, types of the atmospheric conditions (e.g., fog, rain, dry weather), and the like, digital processing stage 290 may use predetermined settings for default selection of various modes. As digital processing stage 290 collects actual mode SNR data, the settings can be modified to more closely respond to the actual environmental conditions. In some implementations, the predetermined settings can depend on time and track changes (e.g., from slow aging) in the lidar optics with time.

Digital processing stage 290 can include one or more Fourier analyzer circuits to analyze digitized signals output by RF combiner/selector 272 and one or more comparators to evaluate SNR of the signals. In some implementations, digital processing stage 290 can include an application-specific integrated circuit (ASIC), a field-programmable gate array (FPGA), microcontroller, a central processing device (CPU), or any other suitable processing device (or any combination thereof).

Figure 4:
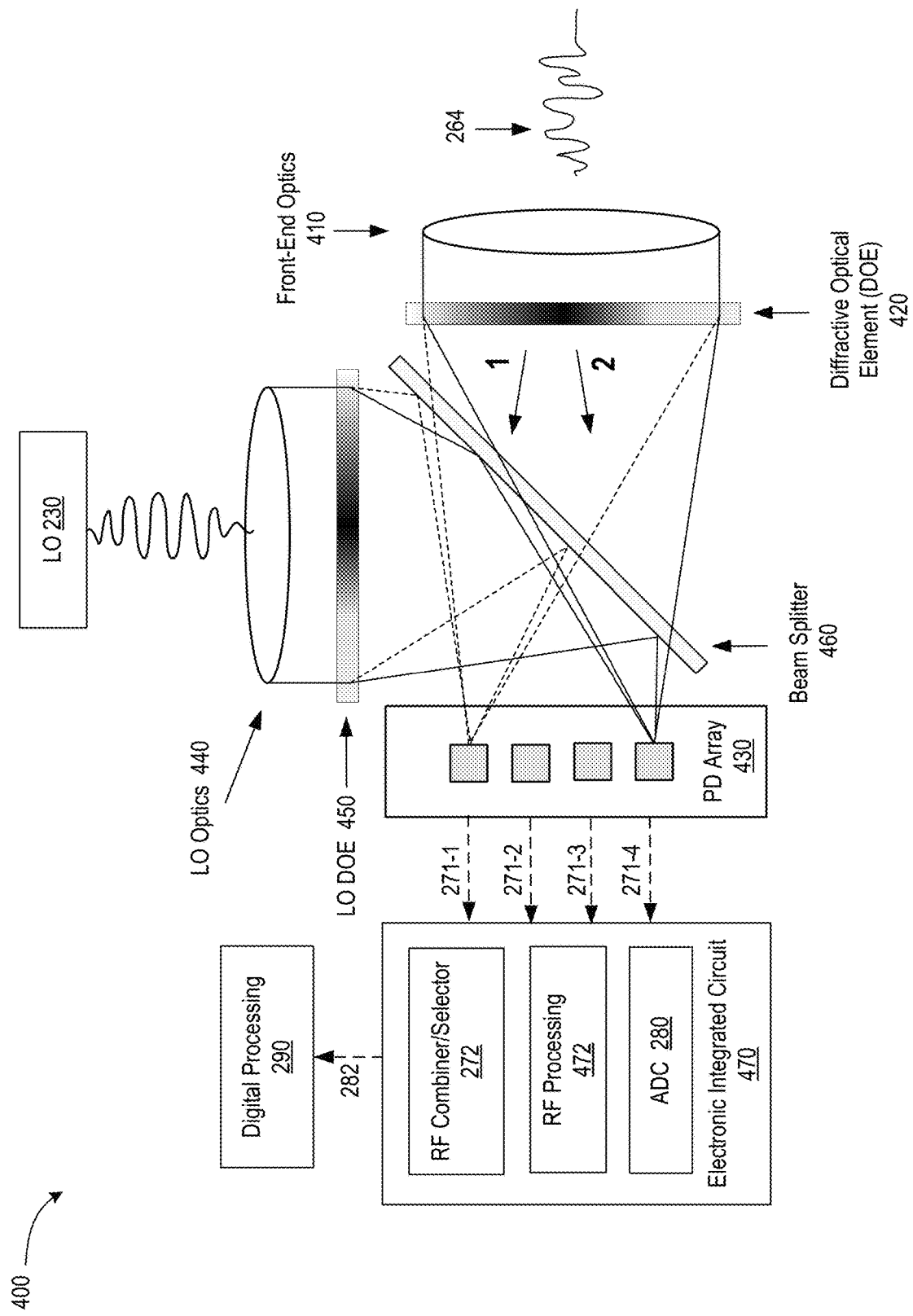
FIG. 4 is a block diagram illustrating another example implementation of a receiver of a lidar device for detection and processing of multiple modes of a reflected beam, in accordance with some aspects of the present disclosure.

FIG. 4 is a block diagram illustrating another example implementation of a receiver 400 of a lidar device for detection and processing of multiple modes of a reflected beam, in accordance with some aspects of the present disclosure. The receiver 400 can be a part of the optical sensing system 200 of FIG. 2, with various high-level objects and components shown in both FIG. 2 and FIG. 4 sharing the same numbers. Received beam 264, which has multiple modes, is incident on front-end optics 410, which can be a lens, an aperture, a combination of apertures, lenses, mirrors, polarizers, prisms, and other optical elements. In some implementations, front-end optics 410 can include a focusing optics, a collimating optics, or a combination thereof. After passing through front end optics 410, received beam 264 can be transmitted through (as depicted) or reflected from a diffractive optical element (DOE) 420 to spatially separate various modes of the received beam 264. DOE 420 can include a hologram (e.g., a holographic plate), a vortex wave plate, a forked diffraction grating, a spatial light modulator, or any other optical element capable of directing different optical modes (e.g., by steering their wave fronts) along slightly different directions. Accordingly, DOE 420 can produce multiple beams corresponding to different modes, as depicted schematically with the solid cone, the dashed cone, and numerals 1 and 2 (for the ease of viewing FIG. 4, only two modes transmitted through DOE 420 are indicated even though the number of modes can be arbitrary). In various implementations, DOE 420 can be configured to generate Hermite-Gaussian beams, Laguerre-Gaussian beams, hypergeometric-Gaussian beams, Bessel beams, or other types of OAM beams. As a result, different modes $\vec{k}_1, \vec{k}_2, \vec{k}_3, \ldots$, having slightly different wave fronts (directions of propagation) can be focused to different locations (as depicted schematically with dashed, solid, and dot-dashed lines) where respective optical interfaces 320-1, 320-2, 320-3, . . . are placed. The optical interfaces can include ends of optical fibers, openings of waveguides, mirrors, and the like.

Each of the optical modes transmitted through front-end optics 410 and DOE 420 can be focused on a respective light detector (depicted with a shaded square) of a photodetector (PD) array 430. To facilitate focusing, additional optical elements (e.g., lenses, mirrors, etc.) can be positioned (not shown) between DOE and PD array 430. In some implementations, the focused optical modes are not focused on the light detectors directly but are instead focused on an end of a fiber or an opening of a waveguide, which are then used to deliver, to the respective light detector, the optical mode thereby captured. Each light detector is also provided with an LO copy 230 of the transmitted (to the target) beam. The LO copy 230 can undergo some optical processing, which can include focusing by an LO optics 440 (using one or more lenses, prisms, polarizers, or a combination thereof) and (in at least some implementations) an LO DOE 450. Although one possible order in which the LO optics 440 and LO DOE interact with the LO copy 230 is depicted in FIG. 4, a different order can be used in some implementations. In some implementations, additional focusing optics can be placed after LO DOE 450. In some implementations, LO optics 440 before LO DOE 450 can be collimating optics whereas additional optical elements placed after LO DOE 450 can be focusing optics. In some implementations, a beam splitter (or a combination of multiple beam splitters) can be used instead of LO DOE 450. Since the LO optics 440 LO DOE 450 combination can have a focal plane that is different from a focal plane of the front end optics 410/DOE 420 focal plane, an additional beam splitter 460 can be used to steer the light of the LO copy 230 to focus where the optical modes (e.g., 1 and 2) are focused (e.g., at fiber/waveguide openings).

Subsequent processing of the received optical modes and the LO copies 230 provided to various light detectors of the PD array 430 can be performed substantially as described above, in conjunction with operations of coherent light detectors 330 of FIG. 3. In some implementations, the PD array 430 can be integrated on a single chip with each light detector (shaded box) having two/four/etc. photodiodes in a balanced configuration, as described in more detail above in conjunction with FIG. 3. Electronic (e.g., RF) signals 271 output by the PD array 430 can undergo electronic analog and digital processing as described in conjunction with FIG. 3. In some implementations, multiple processing stages and modules can be integrated on a single electronic integrated circuit (EIC) 470. For example, EIC 470 can include RF combiner/selector 272, RF processing module 472, and ADC 280. The RF processing module 472 can combine RF modulator 215 (that imparts angular modulation to the transmitted beam and its LO copies) and RF demodulator 274 (that subtracts a copy of the RF encoding imparted to the transmitted beam from one or more tuned RF signals 271-1 . . . 271-4). Digital signal 282 output by EIC 470 is used by the digital processing stage 290 to extract information (velocity and range) about the reflecting object.

Figure 5A:
FIGS. 5A-5C illustrate schematically various possible geometries of a photodetector array that can be used for detection of multiple modes of a reflected beam, in accordance with some aspects of the present disclosure.
Figure 5B:
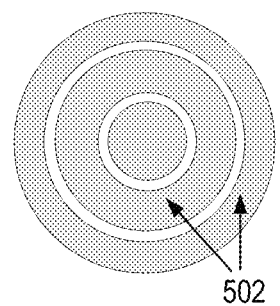
Figure 5C:
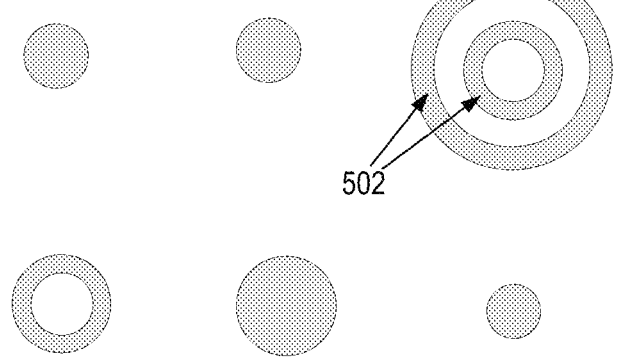

FIGS. 5A-5C illustrate schematically various possible geometries of a photodetector array (e.g., PD array 430 of FIG. 4) that can be used for detection of multiple modes of a reflected beam, in accordance with some aspects of the present disclosure. The shaded areas of the photodetector arrays in FIGS. 5A-5C indicate active regions 502 that collect light. The light in the active regions can be collected using fiber tips, waveguide openings, microlenses, and so on. The depictions of active regions are shown within the plane that is perpendicular to the direction of propagation of the received beam 264 (e.g., the plane that is parallel to DOE 420 of FIG. 4). FIG. 5A illustrates a linear array 500 of active regions, FIG. 5B illustrates a concentric array 510 of active regions, and FIG. 5C illustrates a two-dimensional mixed array 520 of active regions, some of which can include concentric circles. It should be understood that FIGS. 5A-5C are intended for illustration purposes only and that numerous other geometries of active regions are possible. Specific geometries of the active regions 502 can be designed in conjunction with a specific DOE 420 configured to maximize separation of various optical modes into various active regions 502.

Figure 6:
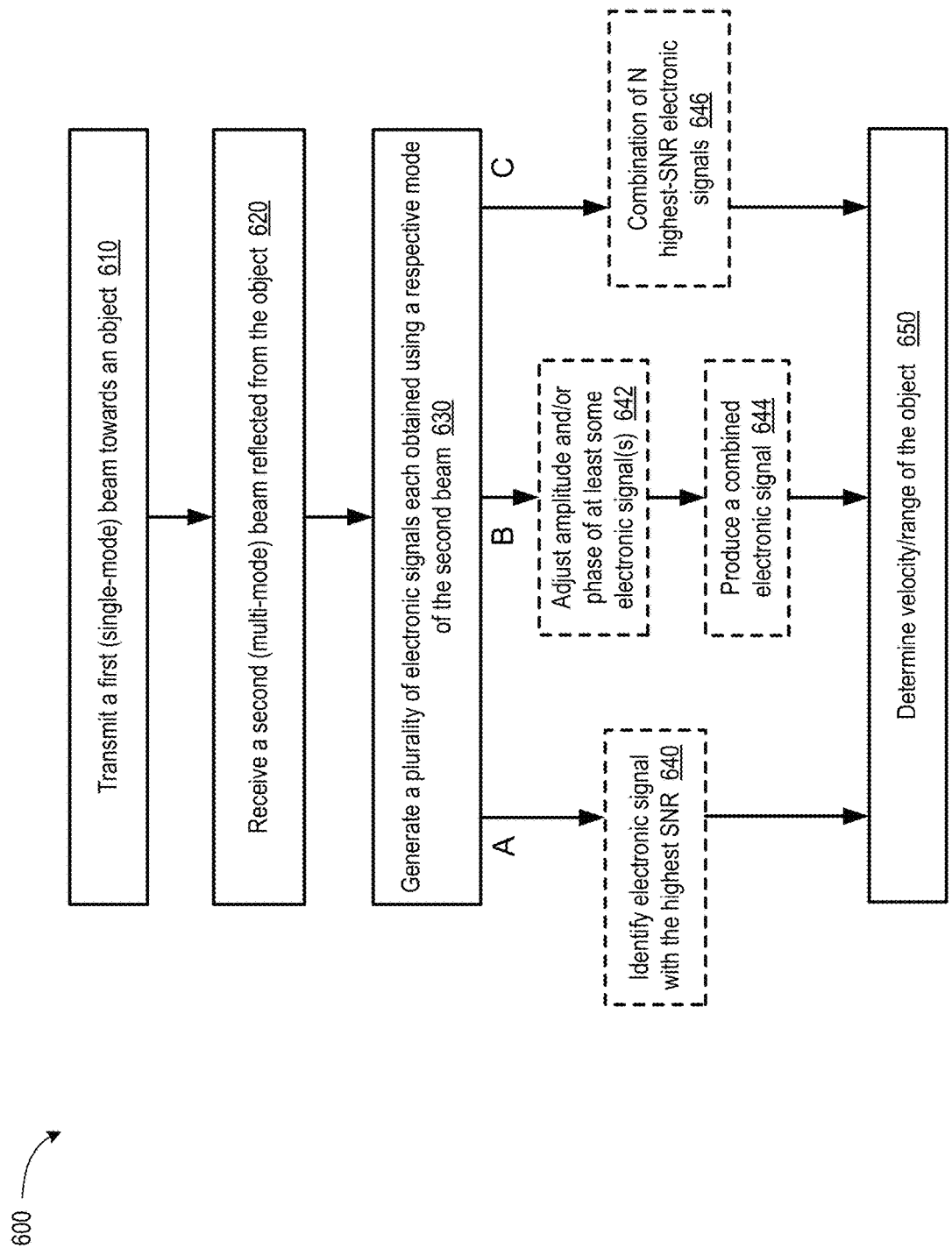
FIG. 6 depicts a flow diagram of an example method of using multiple modes of a received beam for efficient and reliable range and velocity detection, in accordance with some aspects of the present disclosure.

FIG. 6 depicts a flow diagram of an example method 600 of using multiple modes of a received beam for efficient and reliable range and velocity detection, in accordance with some aspects of the present disclosure. Method 600 can be performed using systems and components described in relation to FIGS. 1-5, e.g., by the sensing system 120, optical sensing system 200, and various components thereof. For example, optical sensing system performing some blocks of method 600 can include a transmission (TX) subsystem and a reception (RX) subsystem. In some implementations, the TX subsystem and the RX subsystem can be separate subsystems (a bi-static configuration). In some implementations, various components (e.g., front-end-optics, fibers/waveguides, amplifiers, etc.) can be shared between the TX and RX subsystems (a monostatic configuration) with one or more beam splitters, optical circulators and other optical elements used to separate transmitted and received light. Various operations of method 600 can be performed in a different order than shown in FIG. 6. Some operations of method 600 can be optional (e.g., some of the blocks 640,642-644, and 646 depicted with dashed boxes can be performed while other blocks are not performed). Method 600 can be used for determination of range and velocity of objects in autonomous vehicle environments. Method 600 can be used to improve coverage, resolution, and speed of detection of objects and their state of motion with lidar devices.

Method 600 can include transmitting, at block 610, a first beam (e.g., beam 262 in FIG. 2) towards an object (e.g., object 265 in FIG. 2) using TX optical subsystem (or combined TX/RX optical system). The first (transmitted) beam can be a single-mode beam, e.g., a beam with a well-defined value of the wave vector and polarization. The first signal can include a low-frequency (compared with the frequency of the optical carrier) modulation, e.g., a radio frequency (RF) modulation or a microwave frequency modulation. Modulation can be any type of angle modulation, including phase modulation, frequency modulation, or any combination thereof. In some implementations, modulation can also include an amplitude modulation. The angle modulation can be performed by an electronic (e.g., RF) circuit (e.g. RF modulator 215 in FIG. 2) configured to impart an angle modulation to the beam transmitted towards the object. A local copy (e.g., LO 230 in FIG. 2) of the first beam (e.g., RF-modulated first beam) can remain accessible to the optical sensing system for later use with the reflected beam.

At block 620, method 600 can continue with RX optical subsystem (or combined TX/RX optical subsystem) receiving a second (reflected) beam (e.g., beam 264 in FIG. 2) generated upon interaction of the first beam (e.g., beam 262) with the object. The second (reflected) beam can include a plurality of optical modes (e.g., multiple modes with somewhat different values of the wave vector and/or directions of polarization) caused by an inhomogeneous environment, specifics of the reflecting surface, aberrations of the optics, and the like. In some implementations, the RX optical subsystem can be configured to spatially separate the plurality of modes of the second signal. For example, to spatially separate the plurality of modes, the RX optical subsystem can direct the second beam reflected from the object to pass through, reflect from, or otherwise interact with a holographic optical element (e.g., DOE 420 of FIG. 4) or some other diffractive optical element. Each of the plurality of spatially separated modes of the second (reflected) beam can be delivered to a respective light detector of a plurality of light detectors (e.g., coherent light detectors 330 in FIG. 3) which can be coherent light detectors configured to determine a phase information carried by the respective mode. More specifically, each coherent light detector can be configured to receive, from the RX optical subsystem, (i) a respective mode of the plurality of (received and spatially separated) optical modes (e.g., 325-$x$ in FIG. 3), and the local oscillator (LO) copy of a beam transmitted towards the object. In some implementations, the RX optical subsystem can include a photonic integrated circuit (PIC) having an array of waveguides to deliver each of the plurality of modes to a respective light detector.

At block 630, method 600 can continue with the coherent light detectors generating a plurality of electronic signals (e.g., RF signals 271-x in FIG. 2), with each of the electronic signals obtained using a respective one of the plurality of optical modes. For example, each coherent light detector can include one or more balanced photodetectors having photodiodes connected in series and generating ac electric signals that are proportional to a difference of input optical modes (which can also be processed and amplified). The optical signals that input into a coherent light detector can include: one of (spatially separated) optical modes and a local copy of the first beam. Accordingly, the electronic (e.g., RF) signal produced by each coherent light detector can be representative of a difference between the respective optical mode and the local copy of the first beam. In some implementations, the difference between the respective mode and the local copy comprises a phase difference between the respective mode and the local copy.

At various blocks 640-646, method 600 can process the generated plurality of electronic signals to extract information about the object. In implementation A, as indicated by block 640, method 600 can continue with an electronic circuitry (e.g., RF circuitry) identifying an electronic signal (among the plurality of electronic signals) that has the highest signal-to-noise (SNR) ratio. The highest SNR signal can then be used, at block 650, to determine, using the electronic signal having the highest SNR, a characteristic of the object, such as a velocity of the object and/or a distance to the object. For example, the electronic signal can have a frequency $\Delta f = f_R - f_T$ corresponding to the beating pattern (Doppler shift) between the frequency $f_R$ of the optical mode (to which the electronic mode with the highest SNR corresponds) and the frequency $f_T$ of the transmitted (first) signal. Based on the detected frequency $\Delta f$, one or more circuits of the sensing system can determine the (radial) velocity v of the object, $v = c \Delta f / 2f_T$, using the speed of light c. The one or more circuits can include a processing device, such as a central processing unit (CPU), a field-programmable gate array (FPGA), an application-specific integrated circuit (ASIC), or some other type of processing device. Similarly, the electronic signal can have information about the range of (distance to) the object. For example, the transmitted (first) signal can have a series of frequency (or phase) features, such as a sequence of frequency up-chirps $f_T(t) = f_T + at$, which depend linearly on time t (the rate of the frequency increase being denoted with a) interspersed with a sequence of down-chirps $f_T(t) = f_T - at$ (although linear chirps are used for illustration, any other one or more frequency/phase features can be used), such that the sign of the chirp is reversed at a sequence of time instances $t_1, t_2, \ldots t_j, \ldots$ (e.g., $t_j = j \cdot \tau$). The received optical mode (e.g., corresponding to the highest SMR electronic signal) can have the chirp that reverses the sign at a set of times that are delayed $t_1 - \Delta t, t_2 - \Delta t, \ldots t_j - \Delta t, \ldots$ by some time delay $\Delta t$ compared with the transmitted mode. Having identified, e.g., from the highest SMR electronic signal, that the frequency (or phase) features in the received optical mode are delayed by some time At, the one or more circuits can determine that the distance to the target is $L = c \Delta t / 2$, which is the distance covered by light over one half of the total delay time (time of flight) $\Delta t$. Because time delays are distinct modulo $2\tau$ (one period of chirp-up/chirp-down cycle), the distance to the object can be determined up to increments of $2c\tau$ (such that if $2c\tau = 400$ m, and $c \Delta t/2 = 160$ m, the object potentially can be located at 160 m, 560 m, 960 m, and so on). Further disambiguation of the range can be performed based on the strength of the reflected (second) signal.

In implementation B, as indicated by block 642, method 600 can continue with adjusting (before adding multiple electronic signals together) a phase of at least some of the signals. For example, a phase of a first electronic signal can be adjusted. Similarly, an amplitude of at least some of the signals can be adjusted. For example, an amplitude of the first electronic signal or a second electronic signal can be adjusted. Adjustment of the phases of different electronic signals can be performed to account for different (e.g., somewhat longer or shorter) paths that different optical modes might have traveled on the way to the object and back. Similarly, adjustment of the amplitudes of different electronic signals can be performed to account for different levels of attenuation and scattering that different optical modes might have experienced. For example, one of the signals can have an amplitude that is larger than amplitudes of other signals but can also be characterized by a substantial amount of noise or decoherence. To prevent such a signal from dominating other signals, its amplitude can be reduced compared with other electronic signals (e.g., the amplitude of the signal is amplified to a lesser degree than the amplitudes of other signals). At block 644, a combined electronic signal (e.g., signals 273 in FIG. 2), can be produced, e.g., by combining all (or a subset of) electronic signals together. Subsequently, at block 650, the combined electronic signal can be used (e.g., similarly to how the highest SNR electronic signal is used in implementation A) to determine at least some characteristics of the object (e.g., velocity and/or range).

In implementation C, as indicated by block 646, method 600 can use a combination of implementation A and implementation B. More specifically, N highest SNR electronic signals can be selected. In some instances, N can be a fixed predetermined number of signals. In some instances, N can include all signals whose SNR exceeds a certain threshold SNR. Correspondingly, if two (or all) electronic signals have SNR that exceeds the threshold SNR, two (or all) signals are selected to be included into the combined electronic signal. The phases and amplitudes of the selected N highest SNR signals can then be adjusted before the N signals are combined (e.g., using an electronic combiner circuit) into the combined electronic signal. Subsequently, at block 650, the combined electronic signal can be used (e.g., similarly how the highest SNR electronic signal is used in implementation A) to determine at least some characteristics of the object (e.g., velocity and range).

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it can prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
    an optical subsystem configured to;
        receive a beam reflected from an object, the beam comprising a plurality of modes, and
        use a diffractive optical element to spatially separate the plurality of modes;
    a plurality of light detectors, each of the plurality of light detectors configured to receive, from the optical subsystem:
        a respective mode of the plurality of modes, and
        a local oscillator (LO) copy of a beam transmitted towards the object, and to output:
            one or more electronic signals representative of a difference between the respective mode of the plurality of modes and the LO copy; and
    one or more circuits to determine, based on at least a subset of the one or more electronic signals, at least one of a velocity of the object or a distance to the object.

2. The system of claim 1, further comprising an RF circuit configured to impart an angle modulation to the beam transmitted towards the object, wherein the angle modulation comprises at least one of a phase modulation or a frequency modulation.

3. The system of claim 1, wherein the optical subsystem is further configured deliver each of the plurality of modes to a respective light detector of the plurality of light detectors.

4. The system of claim 3, wherein the diffractive optical element comprises a holographic optical element.

5. The system of claim 1, wherein each of the plurality of light detectors comprises one or more balanced photodetectors.

6. The system of claim 1, wherein the difference between the respective mode and the LO copy comprises a phase difference between the respective mode and the LO copy.

7. The system of claim 1, wherein the one or more circuits comprise:
    a combiner, operatively coupled with the plurality of light detectors, to produce a combined electronic signal based on the one or more electronic signals outputted by each of the plurality of light detectors, and wherein the at least one of the velocity of the object or the distance to the object is determined based on the combined electronic signal, a phase of a first electronic signal of the one or more electronic signals is adjusted.

8. The system of claim 7, wherein to produce the combined electronic signal, the combiner is to adjust at least one of (i) an amplitude of a first electronic signal of the one or more electronic signals, (ii) a phase of at least one of the first electronic signal or a second electronic signal of the one or more electronic signals.

9. The system of claim 1, wherein the optical subsystem comprises a photonic integrated circuit (PIC) having an array of waveguides to deliver each of the plurality of modes to a respective light detector of the plurality of light detectors.

10. The system of claim 1, wherein the one or more circuits are further configured to determine, based on the at least the subset of the one or more electronic signals, a distance to the object.

11. A sensing system comprising:
    an optical subsystem to:
        transmit a first beam towards an object, wherein the first beam is a single-mode beam; and
        receive a second beam generated upon interaction of the first beam with the object, wherein the second beam comprises a plurality of optical modes;
    a light detection subsystem, operatively coupled with the optical subsystem, to
        generate a plurality of electronic signals, wherein each of the plurality of electronic signals is obtained using a respective one of the plurality of optical modes; and
    one or more circuits, operatively coupled with the light detection subsystem, to:
        identify one or more electronic signals of the plurality of electronic signals based at least on signal-to-noise (SNR) ratios of the one or more electronic signals, and determine, using the one or more identified electronic signals, a characteristic of the object, wherein the characteristic of the object comprises at least one of a velocity of the object or a distance to the object.

12. The sensing system of claim 11, wherein each of the plurality of electronic signals is further obtained using a local copy of the first beam and is representative of a phase difference between a respective one of the plurality of optical modes and the local copy of the first beam.

13. The sensing system of claim 11, wherein each of the plurality of electronic signals is a radio frequency signal.

14. The sensing system of claim 11, wherein the one or more electronic signals have highest SNR ratios of the plurality of electronic signals.

15. The sensing system of claim 11, wherein the one or more circuits are configured to:
produce a combined electronic signal comprising two or more electronic signals of the plurality of electronic signals, wherein at least one of the two or more electronic signals has an adjusted phase or an adjusted amplitude; and
determine the characteristic of the object using the combined electronic signal.

16. A method comprising:
transmitting a first beam towards an object, wherein the first beam is a single-mode beam;
receiving a second beam generated upon interaction of the first beam with the object, wherein the second beam comprises a plurality of optical modes;
generating a plurality of electronic signals, wherein each of the plurality of electronic signals is obtained using a respective one of the plurality of optical modes;
identifying one or more electronic signals of the plurality of electronic signals based at least on signal-to-noise (SNR) ratios of the one or more electronic signals; and
determining, using the one or more identified electronic signals, a characteristic of the object, wherein the characteristic of the object comprises at least one of a velocity of the object or a distance to the object.

17. The method of claim 16, wherein each of the plurality of electronic signals is further obtained using a local copy of the first beam and is representative of a phase difference between a respective one of the plurality of optical modes and the local copy of the first beam.

18. The method of claim 16, wherein the first beam comprises a radio frequency (RF) modulation, the method further comprising:
comparing one or more electronic signals to the RF modulation of the first beam.

19. The method of claim 16, wherein the one or more electronic signals have highest SNR ratios of the plurality of electronic signals.

20. The method of claim 16, wherein determining the characteristic of the object comprises:
producing a combined electronic signal comprising two or more electronic signals of the plurality of electronic signals, wherein at least one of the two or more electronic signals has an adjusted phase or an adjusted amplitude; and
determining the characteristic of the object using the combined electronic signal.

* * * * *